United States Patent
Corby, Jr.

(10) Patent No.: US 6,869,022 B2
(45) Date of Patent: Mar. 22, 2005

(54) COMPUTER-AND HUMAN-READABLE PART MARKINGS AND SYSTEM AND METHOD USING SAME

(75) Inventor: Nelson Raymond Corby, Jr., Scotia, NY (US)

(73) Assignee: General Electric Company, Niskayuna, NY (US)

( * ) Notice: Subject to any disclaimer, the term of this patent is extended or adjusted under 35 U.S.C. 154(b) by 259 days.

(21) Appl. No.: 09/681,953

(22) Filed: Jun. 29, 2001

(65) Prior Publication Data

US 2003/0001019 A1 Jan. 2, 2003

(51) Int. Cl.⁷ .............................................. G06K 19/06
(52) U.S. Cl. .................. 235/494; 235/454; 235/462.01; 235/462.24; 235/487
(58) Field of Search ............................ 235/454, 462.01, 235/462.09, 380, 385, 462.24, 487, 494

(56) References Cited

U.S. PATENT DOCUMENTS

| | | | | |
|---|---|---|---|---|
| 3,609,685 A | * | 9/1971 | Deutsch | 382/198 |
| 4,132,976 A | * | 1/1979 | Siegal | 382/184 |
| 4,263,504 A | * | 4/1981 | Thomas | 235/454 |
| 5,324,923 A | * | 6/1994 | Cymbalski et al. | 235/454 |
| 5,585,616 A | * | 12/1996 | Roxby et al. | 235/454 |
| 5,773,811 A | * | 6/1998 | Schramm et al. | 235/462.25 |
| 5,825,015 A | | 10/1998 | Chan | 235/494 |
| 6,135,350 A | * | 10/2000 | White et al. | 235/380 |
| 6,434,340 B1 | * | 8/2002 | Behrens | 340/937 |

FOREIGN PATENT DOCUMENTS

JP  05334488 A  * 12/1993  ............ G06K/9/18

* cited by examiner

Primary Examiner—Steven S. Paik
(74) Attorney, Agent, or Firm—Donald S. Ingraham; Christian G. Cabou

(57) ABSTRACT

A part marking technique based on a string of alphanumeric human-readable characters which are "printed" using a "texture" which is "cut-out" from a two-dimensional redundant bit pattern, e.g., a two-dimensional matrix of data cells selectively occupied or not occupied by dots or other suitable geometric shapes. The bit pattern is readable by a system comprising an imager and a computer for processing the data contained in the acquired image. In the case of a bit pattern formed by visible dots, the system comprises an optical detector, e.g., a television camera or other imager. The part marking is simultaneously readable by a human and a computer system.

16 Claims, 2 Drawing Sheets

COMPUTER-AND HUMAN-READABLE PART MARKINGS AND SYSTEM AND METHOD USING SAME

BACKGROUND OF INVENTION

This invention generally relates to binary codes which are optically readable by a machine and which can be applied on parts or items for the purpose of part identification. More specifically, the present invention relates to machine-readable binary codes consisting of a two-dimensional matrix or array of data cells.

It is desirable to place permanent identifica-tion marks (e.g., a serial number) on parts to track parts, verify proper assembly, maintain inventories, etc. Typically such identification marks take the form of a string of characters (e.g., numbers, letters and special symbols). It is desirable for the marks (placed on the object) to be "human-readable", i.e., that a human operator be able to determine, i.e., recognize, the string of characters without special equipment. Unfortunately, computer systems exhibit poor performance when forced to use the human-readable symbols. High-accuracy reading can be achieved by machine, but the symbols required by the machine system are mostly or totally non-readable by human readers. A compromise uses special fonts such as OCR-A or OCR-B to improve computer recognizability while allowing human readability. The OCR fonts can be easily damaged on the marked surface, leading to errors.

The surface on which part markings are applied can be a paper tag, a plastic bottle, a metal part, etc. Common methods are to print solid characters with ink, paints or dyes, form depressed characters using stamps, etch grooves (or cast raised ribs of material) or font characters from a matrix of dots (or bumps) as in a dot matrix printer. The characters are read optically (by either human or machine) by forming an image of the character string with sufficient contrast to read the character(s) against the background surface. Computer recognition occurs by optically imaging the character strings, digitizing the image and then using optical character recognition software to recognize the character(s) that are present. The overall recognition process has an error rate of 1–2% under the best conditions and often exceeds 10–15% errors.

Computer-based systems (when not required to be human-readable) encode the string of characters into a geometric pattern such as a pattern of vertical bars of varying width and spacing (a one-dimensional code "bar code") to provide higher accuracy (error rates less than 0.1 to 0.01%). One-dimensional bar codes can be read with a fairly high degree of latitude but are not error correcting. At least one intact scan (or horizontal slice) through the entire length of the pattern must be provided.

Newer patterns (such as a "Snowflake" pattern by Electronic Automation Limited of the type disclosed in U.S. Pat. No. 5,825,015) create a two-dimensional pattern of dots that are capable of encoding an entire character string with error detecting and correcting abilities. For example, 40–50% of the pattern can be obliterated or obscured and sufficient information remains to reconstruct the original encoded character string. Also, the density is high, in that strings of 20 to 30 characters can be embedded in a two-dimensional array of dots of perhaps 10 rows and 10 columns. The markings produced by this approach, unfortunately, cannot be read by a human operator. The encoded alphanumeric string can sometimes be printed below the two-dimensional pattern for human reference, but cannot be relied upon for long-term survival.

Thus there is a need for a part marking technique whereby an encoded pattern of dots is simultaneously readable by a human and by a computer system.

SUMMARY OF INVENTION

The present invention is directed to a part marking technique based on a string of alphanumeric human-readable characters which are "printed" using a "texture" which is "cut-out" from a two-dimensional redundant bit pattern, e.g., a two-dimensional matrix of data cells selectively occupied or not occupied by dots or other suitable geometric shapes. This bit pattern is readable by a system comprising an imager and a computer for processing data contained in the acquired image. In the case of a bit pattern formed by visible dots, the system comprises an optical detector, e.g., a television camera or other imager. The part marking is simultaneously readable by a human and a computer system.

In accordance with the preferred embodiment of the invention, a pattern of printable, human-readable characters is created by "masking" or "windowing" a piece of an underlying redundant two-dimensional bit pattern suitable for optical character recognition (OCR). The term "redundant" is used herein in the sense of a particular set of binary values which is repeated multiple times to form the final two-dimensional bit pattern. For example, each alphanumeric character of the part marking can be converted into an 8-bit ASCII code, with a string of n characters being represented by a corresponding string of n 8 bit codes (i.e., a string of 8 n bits). For error correcting codes, a string of m check bits can be added at the end of the 8 n-bit ASCII string. The resulting string is repeated multiple times to form a redundant two-dimensional bit pattern.

In accordance with the preferred embodiment of the invention, an entire string of characters is encoded into a single redundant two-dimensional bit pattern and then this two-dimensional bit pattern is used as a common pattern "under" all letters of the human-readable character string. The redundancy of the two-dimensional bit pattern when encoding a string of characters may, for example, only be 30–40% (requiring 60–70% of the pattern to "show through" each letter). Since most letters will not individually reveal this high a percentage of the underlying two-dimensional bit pattern, a sample two-dimensional pattern could be formed as the spatially registered union of some or all of the character-shaped bit patterns. The required "show through" percentage for the composite sample pattern would then easily exceed the minimum area required after only a few letters.

A part marking in accordance with the preferred embodiment of the invention comprises a plurality of human-readable characters formed by respective areas occupied by respective arrays of machine-detectable marks arranged in a two-dimensional redundant bit pattern. The arrays have shapes indicative of the respective characters. The redundant bit pattern comprises strings of bits forming respective codes identifying the respective characters. The machine-detectable marks preferably comprise dots super-imposed on an optically contrasting background, but the invention is not limited to any particular means for indicating a binary code on a substrate of a part. Instead of printing, the masked two-dimensional bit pattern could be placed on the surface by other methods that rely on deformation of the surface, such as laser etching or dot-impact printing.

The invention also encompasses a method of marking parts by applying arrays of machine-detectable marks to form human-readable shapes resembling characters. The machine-detectable marks are arranged in a two-dimensional redundant bit pattern comprising strings of bits forming respective codes identifying the respective characters.

In accordance with a further aspect of the invention, a preferred system for employing the above-described part marking technique comprises an imager for converting an area of a part occupied by marks into electrical signals having characteristics which allow discrimination between electrical signals derived from imaging of marks and electrical signals derived from imaging of areas outside of marks; and a computer programmed to derive first and second codes, corresponding to first and second characters of the part marking, from the electrical signals output by the imager. More specifically, the computer in accordance with the preferred embodiment is programmed to perform the following steps: digitizing the electrical signals from the imager to form first and second bit maps respectively comprising bits corresponding to first and second multiplicities of machine-detectable marks; spatially registering the first and second bit maps; forming a union of the spatially registered bit maps; and detecting bit strings, corresponding to the first and second codes, in the composite bit map resulting from the union of the spatially registered first and second bit maps. Optionally a scanning system, to which the imager is mounted, is provided for scanning the imager across the part.

In accordance with a further aspect of the invention, a preferred method for employing the above-described part marking technique comprises the steps of acquiring an image of a part marking comprising first and second character-shaped arrays of marks; digitizing the image to form first and second bit maps respectively comprising bits corresponding to said first and second character-shaped arrays of marks; spatially registering the first and second bit maps; forming a union of the spatially registered bit maps; and decoding the composite bit map resulting from the union of the spatially registered bit maps to identify the part. Optionally the method further comprises the step of scanning an imager across the part while a succession of images are acquired.

Other features and aspects of the invention will be disclosed in the detailed description of the preferred embodiments and recited in the claims.

DETAILED DESCRIPTION

Figure 1:
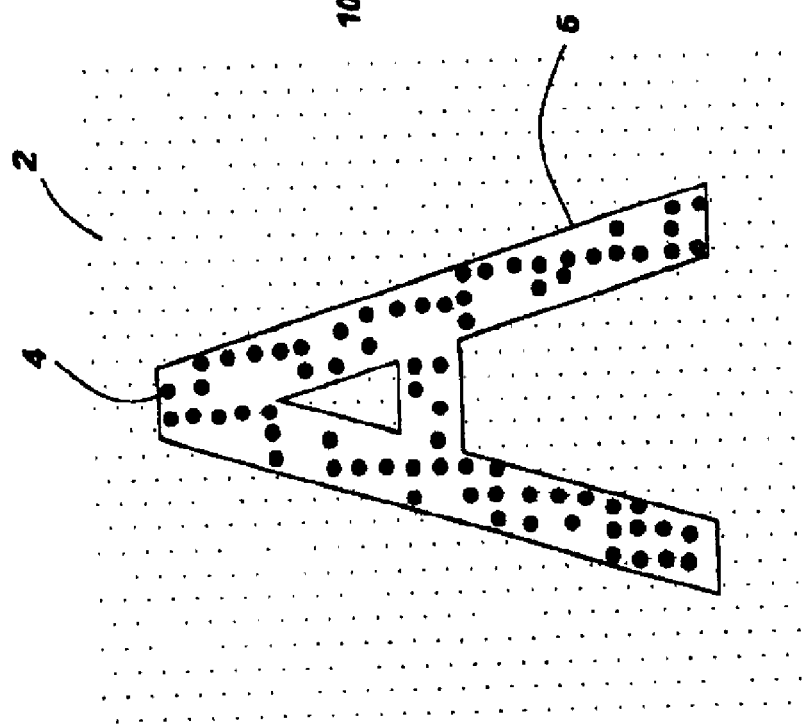
FIG. 1 is a schematic showing a single human-readable character comprising marks arranged in a two-dimensional redundant bit pattern in accordance with the preferred embodiment of the invention. The solid lines outlining the character indicate an exemplary mask which can be used to select marks in the underlying pattern for forming a letter "A". This mask does not appear in the final part marking.

FIG. 1 shows a single human-readable character comprising marks 4 arranged in accordance with a two-dimensional redundant bit pattern in accordance with the preferred embodiment of the invention. The solid outline 6 represents a letter "mask" overlaying a two-dimensional redundant pattern of marks indicated by gray dots 2. The black dots 4 inside the mask 6 correspond to the array of dots which will be printed on the part surface to form a human-readable letter "A". The gray dots 2 and the outline 6 are shown for reference only. Normally, only the black dots 4 within the letter "cutout" boundaries (resulting from applying a negative "A"-shaped mask to the two-dimensional array of marks) would be printed. The gray dots 2 shown would not be printed. The original, underlying two-dimensional array of marks arranged in accordance with the redundant bit pattern can be made arbitrarily dense to improve contrast and legibility of the letter or string of letters. If, for example, the two-dimensional pattern of gray dots 2 were 80% redundant, then the block letter mask 6 must allow at least 20% of the underlying pattern to show (if detection is on a letter-by-letter basis). In practice, the redundancy for a two-dimensional encoding of a single letter probably approaches 95–98%, so that in all such cases, the amount of code "showing through" would exceed the minimum required.

Most part markings consist of a string of characters rather than a single letter. Rather than using a "letter-by-letter" approach (each printed symbol constructed as described above), one can encode the entire string of characters using respective arrays of marks arranged in accordance with a single redundant two-dimensional bit pattern and then use this redundant two-dimensional bit pattern as a common pattern "under" all letters of the character string. The redundancy of the two-dimensional bit pattern when encoding a string may only be 30–40% (requiring 60–70% of the pattern to "show through" each letter). Since most letters will not individually reveal this high a percentage of the underlying two-dimensional bit pattern, a sample two-dimensional bit pattern could be formed as the union of a number of spatially registered bit maps or patterns for some or all characters (e.g., letters). The required "show through" percentage for the composite sample bit map or pattern would then easily exceed the minimum area required after only a few characters.

In accordance with the preferred embodiment of the invention, the individual marks making up the part marking consist of dots which are printed on the surface of the part. These surface dots are exposed to abrasion and other conditions which can lead to removal of some dots. The redundancy of the underlying bit pattern allows a certain proportion of dots to be lost without losing the ability to automatically decipher the machine-readable binary-encoded part identification. Instead of printing, the two-dimensional arrays of marks could be placed on the surface by other methods that rely on a deformation of the surface, such as laser etching and dot-impact printing.

Figure 2:
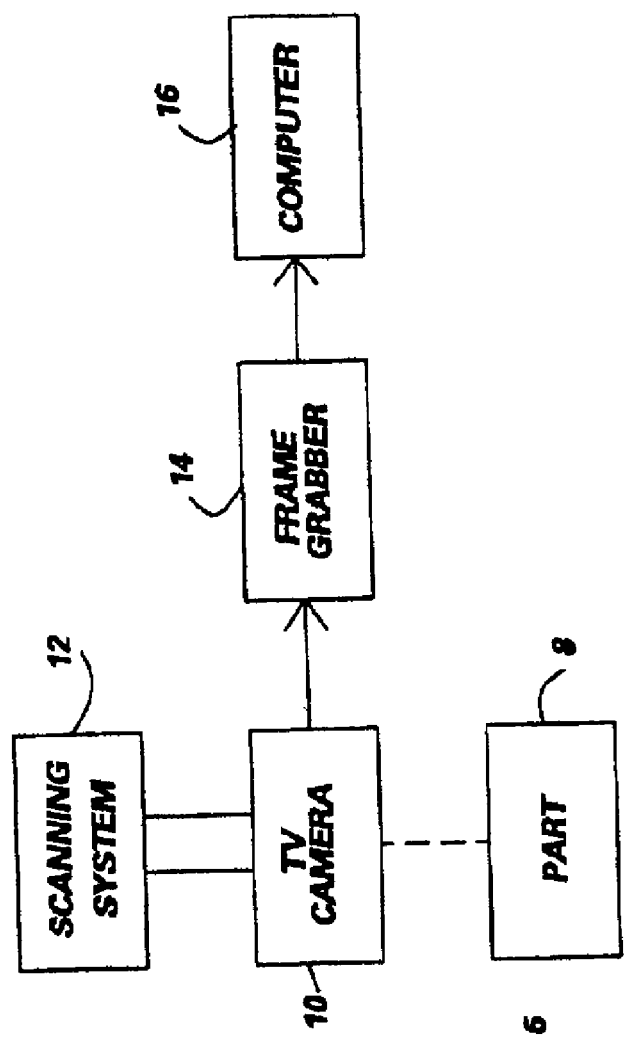
FIG. 2 is a block diagram generally depicting a computer system for automatically identifying parts in accordance with the preferred embodiment of the invention.

FIG. 2 depicts a computer system for automatically identifying parts in accordance with the preferred embodiment of the invention. The preferred system for employing the above-described part marking technique comprises a television camera 10 for converting an area of a part 8 occupied by a part marking into electrical imaging signals having characteristics which allow discrimination between imaging signals derived from imaging of marks and imaging signals derived from imaging of areas outside of marks. The system further comprises a frame grabber 14 which freezes frames acquired by the television camera 10 and transmits those image frames to a computer 16. Optionally, the television camera 10 is mounted on a carriage of an electromechanical scanning system 12 to provide the capability of scanning the marked part 8. Alternatively, the television camera can be stationary, the marked part being physically moved across the field of view of the stationary camera. The computer 16 is programmed to derive a respective code for each character of the part marking from an image frame acquired by the television camera 10. More specifically, the computer 16 in accordance with the preferred embodiment is programmed to perform the following steps: digitizing imaging signals output by the imager to form respective bit maps respectively comprising bits corresponding to respective multiplicities of machine-detectable marks forming respective characters of the part marking; spatially registering the two or more of these bit maps; forming a union of the spatially registered bit maps; and detecting bit strings, corresponding to the respective codes, in the composite bit map resulting from the union of the spatially registered bit maps.

Figure 3:
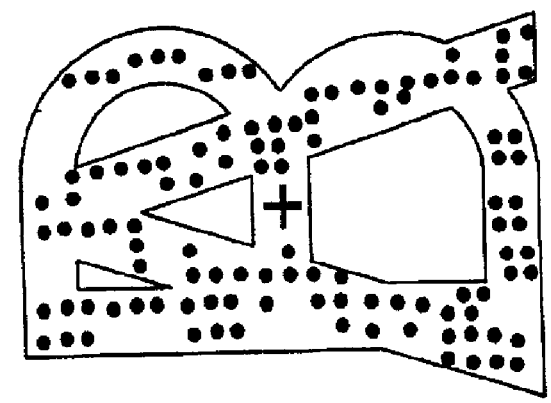
FIG. 3 is a schematic demonstrating the spatial registration and superimposition of two bit maps to provide a composite bit map in accordance with the preferred embodiment of the invention. The solid lines outlining the characters indicate exemplary masks which can be used to select marks in the underlying pattern for forming letters "A" and "B" respectively. These outlines do not appear in the actual part marking and, of course, do not exist during processing by the computer. The "+" symbol on each character is an example of a spatial registration indicator.
Figure 3:
Figure 3:
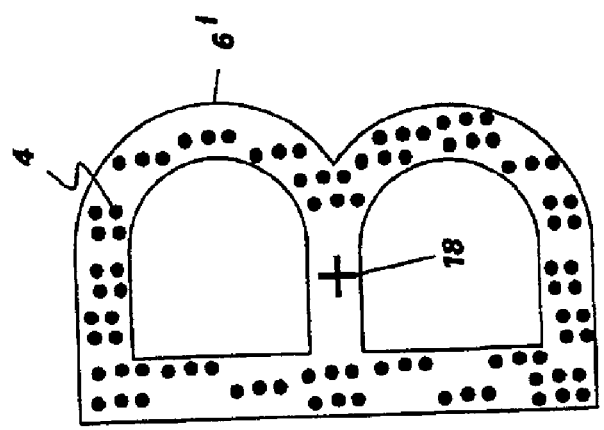
Figure 3:
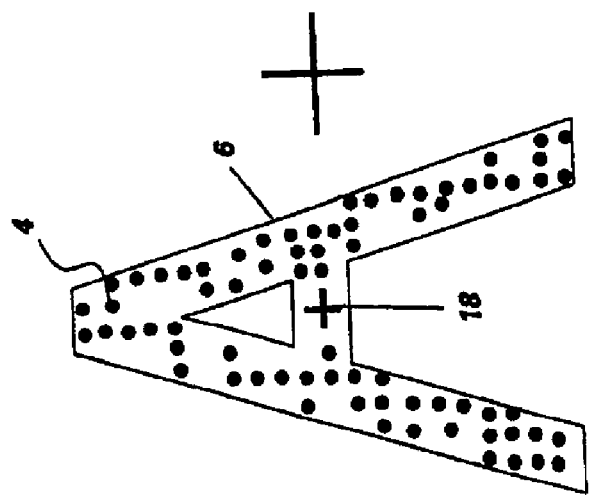

The spatial registration of bit maps for two characters and the formation of a union of those spatially registered bit maps is graphically depicted in FIG. 3. In this example, the letters A and B are assumed to be characters of a part marking which has been scanned by an imaging system. Each character comprises a respective array of dots shown within respective lettermasks 6 and 6'. The underlying machine-readable two-dimensional redundant bit pattern is the same for both human-readable characters. The redundant twobit pattern preferably comprises a repeating sequence of bits comprising a respective unique bit string for each character of the part marking. For example, each alphanumeric character of the part marking can be converted into an 8-bit ASCII code, with a string of n characters being represented by a corresponding string of n 8-bit codes (i.e., a string of 8 n bits). For error correcting codes, a string of m check bits can be added at the end of the 8 n-bit ASCII string. The string of check bits can be mathematically constructed, in well-known manner, to allow reconstruction of the 8n-bit ASCII string in case one or more bits are lost. The resulting string of character code bits and check bits is repeated multiple times to form the redundant two-dimensional bit pattern.

In the example shown in FIG. 3, the underlying redundant bit pattern for each of letters A and B would comprise respective 8-bit strings representing the respective ASCII codes for those letters. Each 8-bit string would be physically manifested on the part by the presence or absence of dots (or other suitable marks) at regularly spaced intervals. The computer system will treat the dots as occupying respective data cells, with each space having no dot representing a vacant or unoccupied data cell. During digitization, occupied data cells are converted into one binary value and unoccupied data cells are converted into the other binary value, thereby converting each line of dots and spaces into a respective line of bits. The result is a bit map in which each detected dot in the part marking is represented by a particular binary value, e.g., unity, while all unoccupied data cells in the part marking are represented by the other binary value, e.g., zero, in the bit map.

In accordance with the preferred embodiment of the invention, the computer is programmed to store a separate bit map for each human-readable character of the part, spatially register two or more of those bit maps, and then form a graphical union of those spatially registered bit maps. To enable spatial registration, each array of dots is provided with one or more spatial registration markers, such as markers 18 shown in FIG. 3. The computer is programmed to locate the spatial registration markers in two or more bit maps and then superimpose those bit maps such that the spatial registration markers are superimposed. The computer then forms the union of the spatially registered bit maps. The composite bit map resulting from spatial registration and superimposition of the letters A and B is symbolically depicted to the right of the equality sign in FIG. 3. In this symbolic depiction of the composite bit map, each dot represents a bit having a binary value equal to unity. The empty data cells represent bits having a binary value equal to zero. As can be seen in FIG. 3, by adding the two-dimensional redundant bit patterns for letters A and B together, the amount of detectable bit pattern can be increased as compared to the respective amounts provided by the letters individually. This increases the probability that the detected bit pattern will have sufficient information to allow the embedded codes for all characters of the part marking to be decoded, thereby enabling identification of the part by its marking, under circumstances where no individual bit pattern for any character has sufficient information to enable all characters of the part marking to be identified. In effect, a composite bit pattern is constructed from the detected individual patterns that has sufficient information to enable the part to be accurately identified.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "bit map" means a mapping in computer memory of binary digits to addresses corresponding to the locations of data cells in a two-dimensional spatial array.

What is claimed is:

1. A part marking comprising at least one multiplicity of machine-detectable marks arranged in accordance with two-dimensional redundant bit patterns, said at least one multiplicity of marks having an appearance to human vision resembling at least one character, and said two-dimensional redundant bit patterns comprising repeating patterns of a bit string forming a respective machine readable code corresponding to said at least one character.

2. The part marking as recited in claim 1, further comprising a plurality of respective multiplicities of machine-detectable marks arranged in accordance with said two-dimensional redundant bit patterns, each of said respective multiplicity of marks having an appearance to human vision resembling a respective character.

3. The part marking as recited in claim 2, further comprising machine-detectable respective spatial registration indicators placed such that each of said respective multiplicities of machine-detectable marks are combinable by aligning said respective spatial registration indicators such that said respective combined multiplicity of marks remain machine detectable.

4. The part marking as recited in claim 1, wherein said machine-detectable marks comprise dots superimposed on an optically contrasting background.

5. The part marking as recited in claim 1, wherein said code is ASCII code.

6. A part marking comprising a plurality at human-readable characters formed in respective areas containing respective arrays of machine detectable marks, each of said array of machine-detectable marks arranged in accordance with two-dimensional redundant bit patterns, each of said arrays of machine-detectable marks in said respective areas having shapes indicative of said human-readable characters, and each of said two-dimensional redundant bit patterns comprising a repeating pattern of a bit siring forming respective machine detectable codes corresponding to said human-readable characters.

7. The part marking as recited in claim 6, further comprising machine-detectable respective spatial registration indicators formed in said respective areas and placed such that each of said respective arrays of machine-detectable marks are combinable by aligning said respective spatial registration indicators such that said respective combined multiplicity of marks remain machine detectable.

8. The part marking as recited in claim 6, wherein said codes are ASCII codes.

9. A system for automatic identification of a part, comprising:
a part comprising a plurality of respective multiplicities of machine-detectable marks arranged in accordance with two-dimensional redundant bit patterns, each of said respective multiplicities of machine-detectable marks having an appearance to human vision resembling a respective character, and said two-dimensional redundant bit patterns comprising a repeating pattern of a bit string forming respective codes corresponding to said respective character;
an imager for imaging an area of said part occupied by said marks to produce electrical signals having characteristics which allow discrimination between electrical signals derived from imaging of marks and electrical signals derived from imaging of areas outside of marks; and
a computer programmed to derive a first code and a second codes from said electrical signals output by said imager.

10. The system an recited in claim 9, wherein said computer is programmed to perform the steps of:
digitizing said electrical signals to form respective bit maps, comprising bits corresponding to each of said respective multiplicities of machine-detectable marks;
spatially registering said respective bit maps;
forming a union of said spatially registered respective bit maps; and
detecting bit strings, corresponding to said respective codes, in the composite bit map resulting from the union of said spatially registered respective bit maps.

11. The system as recited in claim 10, wherein said part further comprises machine-detectable respective spatial registration indicators placed much that each of said respective multiplicities of machine-detectable marks are combinable by aligning said respective spatial registration indicators such that said respective combined multiplicity of marks remain machine detectable.

12. The system as recited in claim 9, wherein said codes are ASCII codes.

13. A method of marking parts for automatic identification, comprising the steps of forming respective human-readable characters in respective areas on said part by applying respective arrays of machine-detectable marks arranged in two-dimensional redundant bit patterns each of said respective arrays of machine-detectable marks having respective shapes indicative of each of said respective human-readable characters, and said two-dimensional redundant bit patterns comprising a repeating pattern of a respective bit string forming respective codes corresponding to each of said respective human-readable characters.

14. A method of automatically identifying parts, comprising the following steps:
marking a part with respective human-readable character-shaped arrays of machine-detectable marks;
acquiring an image of said part marking;
digitizing the acquired image to term respective bit maps comprising bits corresponding to each of said respective human-readable character-shaped arrays of machine-detectable marks;
spatially registering said respective bit maps;
forming a union of said respective spatially registered bit maps; and
decoding the composite bit map resulting from the union of each of said respective spatially registered bit maps to identify the part.

15. A system for automatically identifying parts, comprising:
a part marked with respective human-readable character-shaped arrays of machine-detectable marks;
an imager for acquiring an image of said part marking; and
a computer programmed to perform the following steps:
digitizing the acquired image to form respective bit maps comprising bits corresponding to each of said respective human-readable character-shaped arrays of machine-detectable marks;
spatially registering each of said respective bit maps;
forming a union at said respective spatially registered bit maps; and
decoding the composite bit map resulting from said union of the spatially registered bit maps to identify said part.

16. The system as recited in claim 15, wherein said machine-detectable marks comprise dots superimposed on an optically contrasting surface of said part.

* * * * *

UNITED STATES PATENT AND TRADEMARK OFFICE
CERTIFICATE OF CORRECTION

PATENT NO. : 6,869,022 B2
DATED : March 22, 2005
INVENTOR(S) : Nelson Raymond Corby, Jr.

It is certified that error appears in the above-identified patent and that said Letters Patent is hereby corrected as shown below:

Column 7,
Line 42, change "codes" to -- code --.

Signed and Sealed this

Nineteenth Day of July, 2005

JON W. DUDAS
*Director of the United States Patent and Trademark Office*